United States Patent [19]

Yasunaga et al.

[11] 4,198,664
[45] Apr. 15, 1980

[54] NONRECORDED SECTION DETECTION IN A TAPE RECORDER APPARATUS

[75] Inventors: Tatsuhiro Yasunaga; Masaru Fujii, both of Higashihiroshima, Japan

[73] Assignee: Sharp Kabushiki Kaisha, Osaka, Japan

[21] Appl. No.: 891,642

[22] Filed: Mar. 30, 1978

Related U.S. Application Data

[63] Continuation of Ser. No. 717,925, Aug. 26, 1976, abandoned.

[30] Foreign Application Priority Data

Aug. 28, 1975 [JP] Japan .................................. 50-1739

[51] Int. Cl.² ............................................. G11B 15/52
[52] U.S. Cl. .......................................................... 360/73
[58] Field of Search ................... 360/73, 71, 74, 74.4; 179/100.1 VC

[56] References Cited

U.S. PATENT DOCUMENTS

| | | | |
|---|---|---|---|
| 3,505,485 | 4/1970 | Andrews | 360/73 |
| 3,984,869 | 10/1976 | Fujii et al. | 360/73 |
| 4,027,336 | 5/1977 | Jordan | 360/73 |
| 4,118,743 | 10/1978 | Ban et al. | 360/73 |

Primary Examiner—Robert S. Tupper
Attorney, Agent, or Firm—Birch, Stewart, Kolasch & Birch

[57] ABSTRACT

A nonrecorded section detection switch is provided through which a power supply voltage is applied to an amplifier associated with a reproduction head at a desired time. A switching transistor is connected to receive the output signal of the amplifier and turns ON only when the amplifier develops the signal. A charge/discharge loop is formed through the base and the emitter of the switching transistor, and a level detector is provided to control a tape feed mechanism in accordance with a charge level of the charge/discharge loop.

20 Claims, 4 Drawing Figures

NONRECORDED SECTION DETECTION IN A TAPE RECORDER APPARATUS

This application is a continuation of copending application Ser. No. 717,925, filed on Aug. 26, 1976 now abandoned.

BACKGROUND AND SUMMARY OF THE INVENTION

The present invention relates to a nonrecorded section detecting system in a tape recorder apparatus.

In a conventional nonrecorded section detection system, a charge/discharge circuit is connected to receive an output signal of an amplifier associated with a reproduction head for charging it when the reproduction head contacts a recorded portion. When the charge level of the charge/discharge circuit becomes below a predetermined value after the reproduction head reaches the nonrecorded section, a tape feed mechanism is automatically shifted to its normal playback mode.

It is important in the above-mentioned nonrecorded section detection system of the prior art that the output level of the amplifier is considerably high to perform an accurate operation. Moreover, variations of the power supply voltage greatly influence the accuracy of the detection of the nonrecorded section in the prior art system.

Accordingly, an object of the present invention is to provide a nonrecorded section detection system for a tape recorder apparatus which ensures an accurate operation.

Another object of the present invention is to provide a nonrecorded section detection system for a tape recorder apparatus which can accurately detect the nonrecorded section even when the power supply voltage varies.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a switching transistor is connected to receive an output signal of an amplifier associated with a reproduction head when a nonrecorded section detection switch is depressed. A charge/discharge loop is connected to receive its charge current through the switching transistor when the reproduction head contacts a recorded section and, hence, the switching transistor is ON. When the charge level of the charge/discharge circuit becomes below a predetermined value after the reproduction head reaches the nonrecorded section, that is, the switching transistor becomes OFF, a tape feed mechanism is automatically shifted to its normal playback mode.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
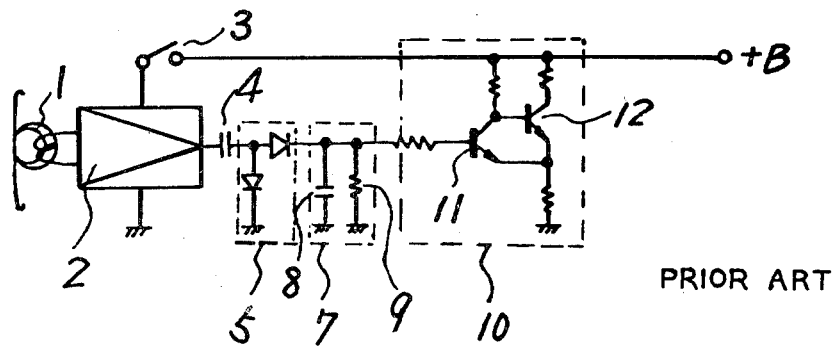
FIG. 1 is a circuit diagram of a nonrecorded section detection system in a tape recorder apparatus of the prior art.

Referring now in detail to the drawings, and to facilitate a more complete understanding of the present invention, a nonrecorded section detection system of the prior art will be first described with reference to FIG. 1.

A nonrecorded section detection switch 3 is mechanically associated with a tape feed mechanism. When the nonrecorded section detection switch 3 is depressed, the tape feed mechanism is shifted to a fast feed mode and the system is placed in a nonrecorded section detection mode, whereby a limiter/amplifier 2 is connected to receive the power supply through the nonrecorded section detection switch 3. Under these conditions, when a reproduction head 1 contacts a recorded section, the limiter/amplifier 2 develops an output signal to charge a charge/discharge circuit 7 through a capacitor 4 and a rectifying circuit 5.

When the reproduction head 1 reaches a nonrecorded section, the limiter/amplifier 2 ceases to develop the charging signal and, therefore, the charge stored in a capacitor 8 is discharged through a resistor 9. When the charged level across the capacitor 8 is reduced below a predetermined value, a level detector 10 made of a Schmitt trigger circuit is actuated, thereby enabling a plunger to shift the tape feed mechanism into the normal playback mode.

The time delay in the circuit 7, that is, a time interval beginning at the termination of the output signal from the limiter/amplifier 2 and ending at the switching of the level detector 10 is a most important factor to perform an accurate operation. This time interval greatly varies when a power supply voltage $+B$ varies in the prior art system, because the charge/discharge circuit 7 receives the output signal of the limiter/amplifier 2 as its charging current and the output level of the limiter/amplifier 2 is considerably lower than the power supply level $+B$.

Figure 2:
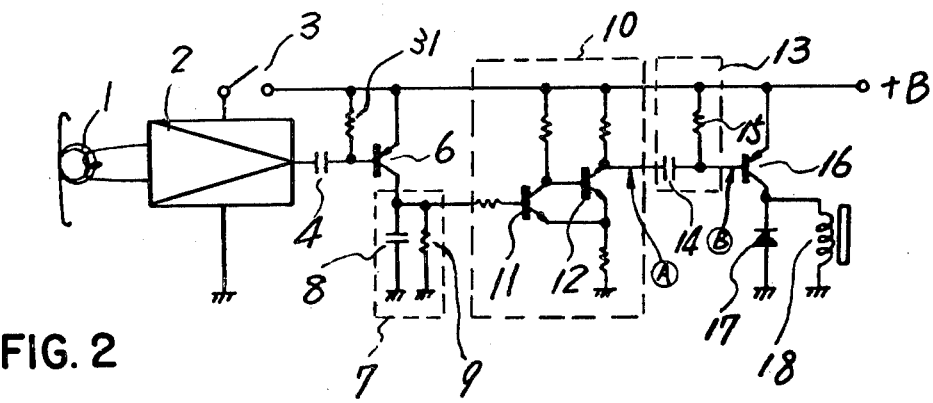
FIG. 2 is a circuit diagram of an embodiment of a nonrecorded section detection system of the present invention.

FIG. 2 shows an embodiment of a nonrecorded section detection system of the present invention, which comprises a reproduction head 1, a limiter/amplifier 2, a nonrecorded section detection switch 3 associated with the tape feed mechanism, a capacitor 4, a resistor 31, and a switching transistor 6, the capacitor 4, the resistor 31 and the switching transistor 6 forming, in combination, a switching charge circuit. The present nonrecorded section detection system further comprises a charge/discharge circuit 7 including a capacitor 8 and a resistor 9, a level detector 10 comprising a Schmitt trigger circuit including transistors 11 and 12, a differentiation circuit 13 including a capacitor 14 and a resistor 15, a transistor 16, and a protective diode 17 for the transistor 16.

When the nonrecorded section detection switch 3 is depressed under the playback mode, the tape feed mechanism is shifted to a fast feed mode and the system is placed in the nonrecorded section detection mode. The reproduction signal from the reproduction head 1 is applied to the limiter/amplifier 2, which develops an output signal to the base electrode of the switching transistor 6 through a coupling circuit made of the capacitor 4 and the resistor 31. When the output level of the limiter/amplifier 2 is above the base to emitter voltage VBE of the switching transistor 6, the switching transistor 6 is ON and, hence, the capacitor 8 is charged up to the power supply voltage +B. Thus, charged voltage is applied to the level detector 10, whereby the transistor 11 is ON and the transistor 12 is OFF. The collector electrode Ⓐ of the transistor 12 is maintained at the power supply level +B. The transistor 16 is OFF and, hence, a solenoid 18 is not enabled, because no voltage difference appears across the capacitor 14.

When the reproduction head 1 reaches a nonrecorded section, the limiter/amplifier 2 ceases to develop its output signal and, therefore, the switching transistor 6 is OFF. The voltage charged across the capacitor 8 is discharged through the resistor 9. The transistor 11 is OFF and the transistor 12 is ON after a time period determined by the time constant of the charge/discharge circuit 7 and the threshold level of the level detector 10. At this moment, the collector electrode Ⓐ of the transistor 12 is maintained around the ground potential and, therefore, a charge current for the capacitor 14 flows from the power supply +B through the resistor 15, the capacitor 14 and the point Ⓐ. This current renders the transistor 16 ON and, hence, the solenoid 18 is enabled. The solenoid 18 functions to shift the tape feed mechanism into its normal playback mode and to reset the nonrecorded section detection switch 3.

In the foregoing embodiment, the charge/discharge circuit 7 is connected to the power source voltage +B through the switching transistor 6 when the reproduction signal is derived from the limiter/amplifier 2. Therefore, the output level of the limiter/amplifier 2 is required not to be high but to be sufficient to turn on the switching transistor 6. Moreover, the variations of the power supply voltage +B is self-compensated. When the power supply voltage +B rises, both the voltage charge across the capacitor 8 and the threshold level of the level detector 10 are increased.

The differentiation circuit 13 functions to prevent erroneous operation of the transistor 16. More particularly, the differentiation circuit 13 detects the trailing edge of the signal appearing at the point Ⓐ, thereby conducting the transistor 16 only when the nonrecorded section is detected after the provision of the reproduction signal.

Figure 3:
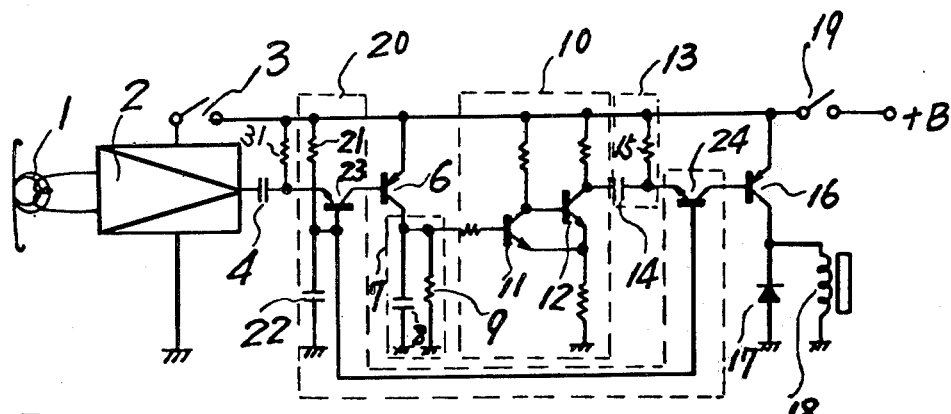
FIG. 3 is a circuit diagram of another embodiment of a nonrecorded section detection system of the present invention.

FIG. 3 shows another embodiment of the nonrecorded section detection system of the present invention. Like elements corresponding to those of FIG. 2 are indicated by like numerals.

In the embodiment of FIG. 2, there is a possibility that a charging current will flow to the capacitor 14 and the capacitor 4 at the time of the power throw operation. The charge current to the capacitor 14 will turn on the transistor 16 and, hence, the solenoid 18 will be enabled. The charge current to the capacitor 4 will turn on the transistor 6, thereby charging the capacitor 8. Therefore, the solenoid 18 will be enabled after a time period determined by the time constant of the charge/discharge circuit 7 and the threshold level of the level detector 10.

An error operation preventing circuit 20 functions to prevent the above-mentioned error operation at the time of the power throw operation. When a power switch 19 is thrown, a charging current flows to the capacitor 4 through the power supply source +B, the resistor 31, the capacitor 4 and the limiter/amplifier 2. At this moment a switching transistor 23 functions to disconnect the transistor 6. Also a charging current flows to the capacitor 14 from the power supply source +B, the resistor 15, the capacitor 14 and the level detector 10 when the power switch 19 is closed. At this moment a switching transistor 24 functions to disconnect the transistor 16.

The base electrodes of the switching transistors 23 and 24 are connected to each other and to a delay circuit comprising a resistor 21 and a capacitor 22. When the power switch 19 is closed, a charging current flows to the capacitor 22 through the power supply source +B, the resistor 21 and the capacitor 22, whereby the voltage level appearing across the capacitor 22 is increased from zero toward the power supply voltage +B. The switching transistors 23 and 24 are maintained OFF until the voltage level appearing across the capacitor 22 becomes higher than the emitter level of the transistors 23 and 24 or the base to emitter voltage +VBE. During the time period when the transistors 23 and 24 are OFF, the resistor 31, the capacitor 4, the transistor 6, the differentiation circuit 13 and the transistor 16 are disconnected. The aforementioned erroneous operation of the solenoid 18 at the power throw operation can be prevented by selecting the time period when the transistors 23 and 24 are OFF to be longer than the time required to charge the capacitors 4 and 14.

Figure 4:
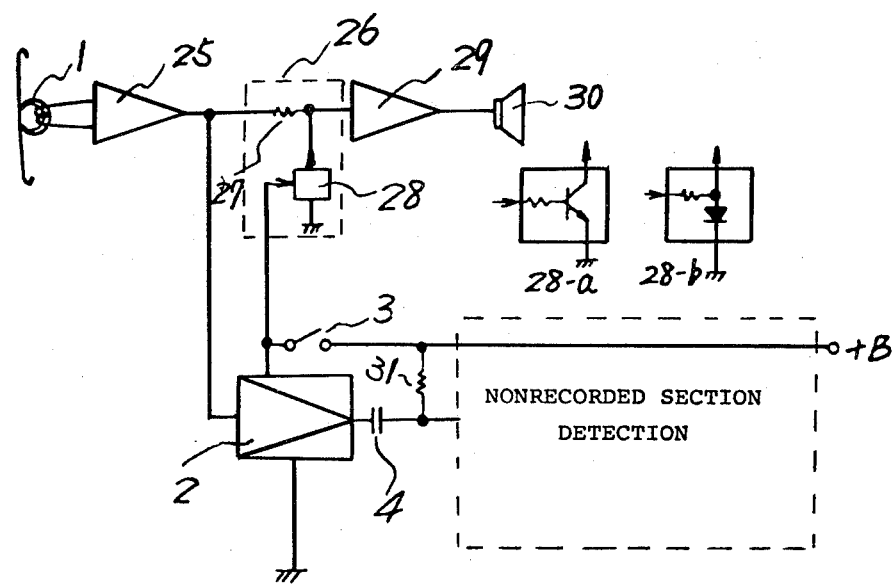
FIG. 4 is a schematic circuit diagram of a tape recorder apparatus employing a nonrecorded section detection system of the present invention.

FIG. 4 shows an example of a tape recorder apparatus employing the nonrecorded section detection system of the present invention. An output signal of an equalization amplifier 25 is applied to a low-frequency amplifier 29 via an electronic attenuator 26. The output signal of the low-frequency amplifier 29 activates a speaker 30. The output signal of the equalization amplifier 25 is also applied to the limiter/amplifier 2 associated with the nonrecorded section detection system.

In the nonrecorded section detection mode, the output level of the reproduction head 1 is greater than that of the normal playback mode, because the tape feed speed is considerably high. Therefore, the monitor sound derived from the speaker 30 is very loud. In the tape recorder apparatus of the prior art, the low-frequency amplifier 29 is cut off, thereby preventing the activation of the speaker 30 during the nonrecorded section detection operation.

In the example of FIG. 4, small monitor sound is derived from the speaker 30, thereby indicating the nonrecorded section detection mode. The electronic attenuator 26 includes a resistor 27 and an electronic variable resistor element 28 made of, for example, a transistor 28-a or a diode 28-b.

The input level of the resistor element 28 is zero when the nonrecorded section detection switch 3 is open and, therefore, the output impedance of the element 28 is considerably high. The output signal of the equalization amplifier 25 is applied to the low-frequency amplifier 29 without attenuation.

The input terminal of the element 28 is connected to the power supply source +B when the nonrecorded section detection switch 3 is closed and the system is placed in the nonrecorded section detection mode. The output impedance of the element 28 is reduced and, therefore, the output signal of the equalization amplifier 25 is applied to the low-frequency amplifier 29 after being attenuated by the resistor 27 and the output impedance of the element 28 and the small monitor sound is generated.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A nonrecorded section detection system for detecting a nonrecorded section provided between two adjacent programs recorded on a magnetic tape in a tape recorder apparatus, said nonrecorded section detection system comprising:
    a power supply source;
    reproduction head means which is placed in physical contact with said magnetic tape for generating an output signal indicative of the presence of a recorded section of said magnetic tape;
    tape feed means for moving said magnetic tape past said reproduction head in a selected one of a plurality of operation modes;
    amplifier means for amplifying said output signal from said reproduction head means;
    nonrecorded section detection means for connecting said amplifier means to said power supply source at a desired time;
    switching means responsive to an output signal of said amplifier means in such a manner that said switching means assumes a first condition when said output signal of said amplifier means is above a predetermined level and assumes a second condition when said output signal of said amplifier means is below said predetermined level;
    charge/discharge circuit means connected to receive charging current from said power supply source through said switching means when said switching means assumes said first condition;
    level detector means for detecting the charge level of said charge/discharge circuit; and
    control means for charging said tape feed means from said selected one of said operation modes to another in accordance with the detection of said level detector means.

2. The nonrecorded section detection system of claim 1, wherein the switching means comprises a transistor the base of which is connected to receive the output signal of the amplifier means and the collector is connected to the charge/discharge circuit means.

3. The nonrecorded section detection system of claim 1, wherein the nonrecorded section detection switch is mechanically associated with said tape feed means.

4. The nonrecorded section detection system of claim 1, wherein the amplifier means comprises a limiter/amplifier means.

5. The nonrecorded section detection system of claim 1, wherein the level detector means comprises a Schmitt trigger circuit.

6. The nonrecorded section detection system of claim 1, which further comprises a differentiation circuit means for differentiating an output signal of the level detector means, the output signal of the differentiation circuit means being applied to said control means.

7. The nonrecorded section detection system of claim 6, which further comprises an error operation preventing means for disconnecting said differentiation circuit means and said control means when said power supply source is first connected to said non-recorded section detection system.

8. The nonrecorded section detection system of claim 7, wherein said error operation preventing means comprises semiconductor means coupled between said differentiation circuit means and said control means, said semiconductor means being OFF when said power supply is first connected to said nonrecorded section detection system and blocking the operation of said differentiation circuit means and said control means when in said OFF condition, and time delay means for turning said semiconductor means ON a predetermined period of time after said power supply is connected to said nonrecorded section detection system.

9. The nonrecorded section detection system of claim 1, which further comprises an error operation preventing means for disconnecting said switching means when said power supply source is first connected to said nonrecorded section detection system.

10. The nonrecorded section detection system of claim 9, wherein said error operation preventing means comprises semiconductor means coupled between said switching means and said amplifier means, said semiconductor means being OFF when said power supply source is first connected to said nonrecorded section detection system and blocking the operation of said switching means when in said OFF condition, and time delay means for turning said semiconductor means ON a predetermined period time after said power supply source is connected to said nonrecorded section detection system.

11. A nonrecorded section detection system for detecting a nonrecorded section provided between two adjacent programs recorded on a magnetic tape in a tape recorder apparatus including, a power supply source, reproduction head means for generating an output signal indicative of the presence of a recorded section on said magnetic tape, tape feed means for moving said magnetic tape past said reproduction head in a selected one of a plurality of operation modes; means for amplifying said output signal from said reproduction head means, and a control means for changing the operation state of said tape feed means, said nonrecorded section detection system comprising:
    switching means responsive to an output signal of said amplifier means in such a manner that said switching means assumes a first condition when said output signal of said amplifier means is above a predetermined level and assumes a second condition when said output signal of said amplifier means is below said predetermined level;
    charge/discharge circuit means connected to receive its charge current from a power supply source through said switching means when said switching means assumes said first condition; and
    means for operating said control means to change the operation mode of said tape feed means in accordance with the charge level of said charge/discharge circuit means.

12. The nonrecorded section detection system of claim 4, wherein said means for operating said control means comprise level detector means for detecting the charge level of said charge/discharge circuit.

13. The nonrecorded section detection system of claim 12, which further comprises a differentiation circuit means for differentiating an output signal of the level detector means, the output signal of the differentiation circuit being applied to said control means.

14. The nonrecorded section detection system of claim 11, which further comprises a nonrecorded section detection switch means for placing said nonrecorded section detection system into an operative condition.

15. A nonrecorded section detection system for detecting a nonrecorded section provided between two adjacent programs recorded on a magnetic tape in a tape recorder apparatus, said nonrecorded section detection system comprising:

reproduction head means which is placed in physical contact with said magnetic tape for developing an output signal indicative of the presence of a recorded section on said magnetic tape;
   tape feed means for moving said magnetic tape past said reproduction head in a selected one of a plurality of operation modes;
   charge/discharge circuit means responsive to said output signal from said reproduction head means to charge to a predetermined level;
   level detector means for detecting said predetermined level of said charge/discharge circuit means and generating a control signal means;
   differentiation circuit means for differentiating the control signal of said level detector means; and
   control means connected to receive the differentiated control signal from said differentiation circuit for changing said tape feed means from said selected one of said operation modes to another.

16. The nonrecorded section detection system of claim 15 wherein said differentiation circuit means develops said differentiated output when said level detector means detects that said output signal of said reproduction means has terminated.

17. The nonrecorded section detection system of claim 16, wherein said level detector means comprises a Schmitt trigger circuit.

18. The nonrecorded section detection system of claim 15, wherein said control means comprise means solenoid for shifting the operation mode of said tape feed means.

19. The nonrecorded section detection system of claim 18, wherein said solenoid means is enabled by said differentiated output of said differentiation circuit means.

20. In a nonrecorded section detection system for detecting a nonrecorded section provided between two adjacent programs recorded on a recording medium in a reproduction system including, tape feed means for moving said magnetic tape past said reproduction head in a selected one of a plurality of operation modes,
   reproduction head means for generating an output signal indicative of the presence of a recorded section on said recording media, a nonrecorded section detection circuit means connected to receive said output signal derived from said reproduction head for developing a nonrecorded section detection signal, and a control means for changing the operation of said tape drive means, the improvement in said nonrecorded section detection system comprising;
   differentiation circuit means for differentiating said nonrecorded section detection signal derived from said nonrecorded section detection circuit means, the output signal of the differentiation circuit being applied to said control means, thereby stabilizing and speeding up the operation of the control means.

* * * * *